J. HUVERSTUHL.
LUBRICATOR.
APPLICATION FILED OCT. 20, 1910.
991,723.
Patented May 9, 1911.
2 SHEETS—SHEET 1.
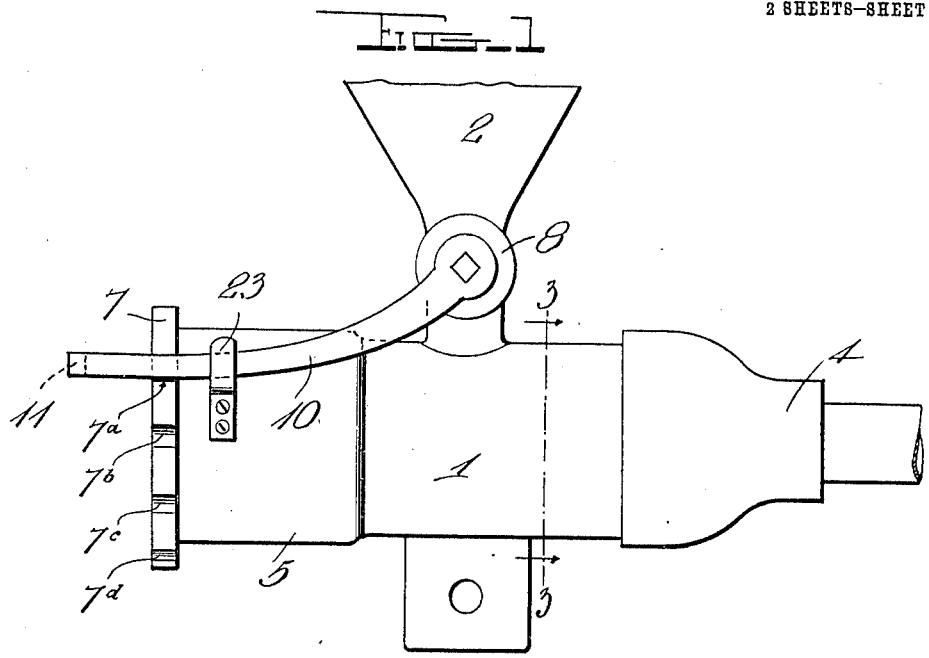
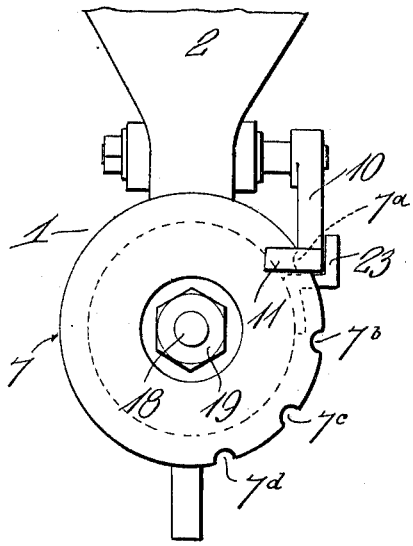
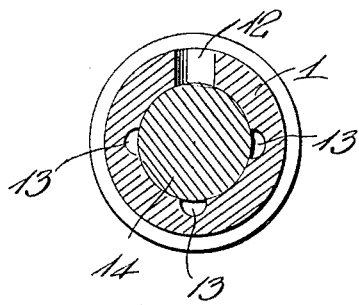
Witnesses
Inventor
J. Huverstuhl
by H. B. Willson & Co.
Attorneys

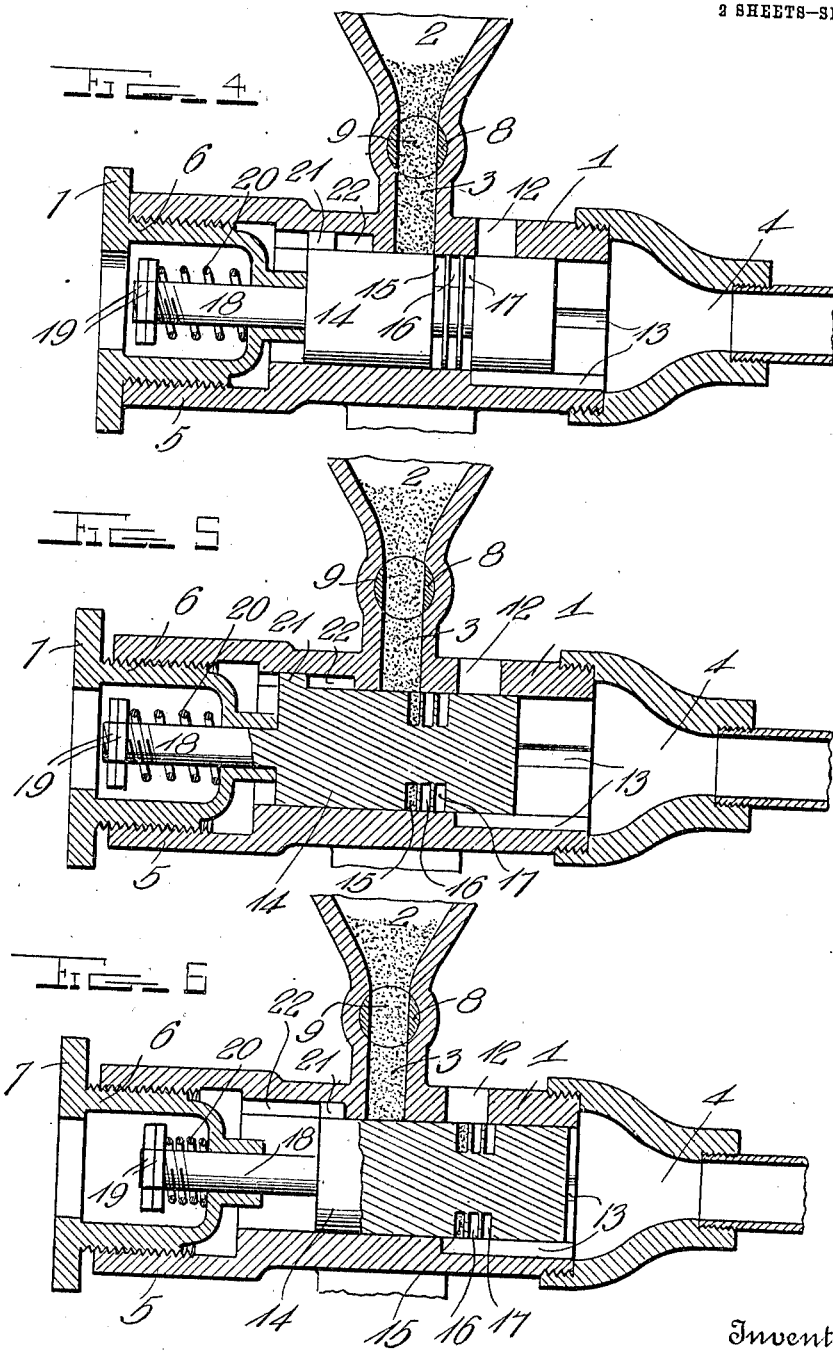

UNITED STATES PATENT OFFICE.

JOSEPH HUVERSTUHL, OF LOS ANGELES, CALIFORNIA.

LUBRICATOR.

991,723.  Specification of Letters Patent.  Patented May 9, 1911.

Application filed October 20, 1910. Serial No. 588,131.

*To all whom it may concern:*

Be it known that I, JOSEPH HUVERSTUHL, a citizen of the United States, residing at Los Angeles, in the county of Los Angeles and State of California, have invented certain new and useful Improvements in Lubricators; and I do declare the following to be a full, clear, and exact description of the invention, such as will enable others skilled in the art to which it appertains to make and use the same.

This invention relates to improvements in lubricators and more particularly is designed as an improvement over Patent #832,051, dated October 2, 1906, and is adapted for feeding granular or flaked graphite to the cylinders and valves of engines and other machinery.

One object of the invention is to provide a device of this class in which a predetermined quantity of powdered graphite may be fed into the parts to be lubricated by the inrush of air to fill a vacuum produced by the operation of the engine or other machine upon which the lubricator is used.

Another object is to improve and simplify the construction and operation of the feeder, and thereby render it more efficient and durable in use and less expensive to manufacture.

Another object is to provide a combined cock operating lever and lock for the adjusting device of the feeder.

With these and other objects in view, the invention consists of certain novel features of construction, combination and arrangement of parts as will be more fully described and particularly pointed out in the appended claims.

In the accompanying drawings, Figure 1 is a side elevation of a lubricator constructed in accordance with this invention; Fig. 2 is an end elevation thereof; Fig. 3 is a transverse vertical section taken on the line 3—3 of Fig. 1; Fig. 4 is a longitudinal section with the feeder in inoperative position; Fig. 5 is a similar view showing the feeder in position to receive a charge in one of its pockets, with the adjusting nut moved outwardly and the returning spring in the position which it assumes when the feeder is in this position; Fig. 6 is a similar view showing the feeder in discharging position, which it assumes when suction occurs in the feed pipe connected therewith.

In the embodiment illustrated a lubricator is shown which comprises a body 1 having a feed cup or hopper 2 disposed thereabove and communicating therewith through a passage or port 3 to provide for the feeding of the graphite by gravity from said cup into said body. This body 1 as shown has its opposite ends open and upon one is secured a discharge pipe 4 connected therewith by any suitable means and which leads to a cylinder, steam pipe, steam chest, relief valve or any other part of an engine or machine which it is desired to lubricate. The opposite end of the body 1 is preferably enlarged as shown at 5, and is provided on its inner face with screw threads adapted to engage similar threads on a feed adjuster cap 6 having a laterally extending flange 7 on its outer end against the inner face of which the outer edge of the body 1 is adapted to abut when the feeder is arranged in inoperative position as shown in Fig. 4. This flange 7 is provided in its periphery with a plurality of spaced notches, any desired number of which may be employed, four being here shown, and numbered $7^a$, $7^b$, $7^c$ and $7^d$, respectively, and which are designed to receive a locking member hereinafter described. Mounted in the port 3 which leads from the cup 2 to the interior of the body 1 is a cock or valve 8 having an opening 9 therein which is adapted to register with the port when said valve is turned in one direction, and to cut off communication with said body when turned in another direction. A handle member or lever 10 is secured to this cock or valve 8 and extends laterally therefrom and is provided at its free end with a hook 11 preferably formed by bending the terminal thereof at right angles, and which is designed to engage the flange 7 of the feed adjuster cap 6 for holding it in adjusted position and prevent the accidental unscrewing thereof. This body 1 is provided at one side of the cup 2 with an air inlet opening 12 arranged between said cup and the discharge pipe 4, and longitudinally extending discharge grooves 13 are arranged on the inner face of said body 1 near its outer end, as shown clearly in Fig. 4, and which are designed to receive a charge of graphite from the feeder and transmit it through the pipe 4 to the part to be lubricated.

Mounted to reciprocate in the cylindrical body 1 is a feeder 14 which is provided near its outer end with a plurality of graphite receiving pockets, any desired number of which may be used, three being here shown, and numbered 15, 16 and 17 respectively, and are adapted to alternately communicate with the supply passage 3 and the discharge passage 13. This feeder 14 is preferably constructed in one piece, and the pockets 15, 16 and 17 are formed by annular grooves cut in the periphery of said feeder near its front end. This feeder 14 is provided at its outer end with a reduced extension 18, the free end of which is screw threaded to receive an adjusting or jam nut 19, and between which and the inner face of the cap 6 is arranged a coiled spring 20 which is wound on the stem or extension 18 and is designed to act as a return spring for the feeder 14, as will be hereinafter described. The head or piston of the feeder 14 is provided with a laterally extending lug 21, preferably formed adjacent its connection with the stem 18. This lug 21 slides in a groove 22 formed in one wall of the inner face of the body 1, the inner end of which serves as a stop to limit the movement of the feeder 14 in one direction and the end of said groove 22 is so positioned as to stop the feeder on its discharge movement in position to bring the pockets therein opposite the air inlet 12 and the graphite outlets 13, as shown in Fig. 6. When the suction or vacuum in the pipe 4 is broken the spring 20 which has been compressed by the forward movement of the feeder will exert its tension to return the feeder 14 to the position shown in Fig. 5, with the head or piston of the feeder resting against the inner end of the cap 6, said inner end being preferably reduced to form a stop for said feeder as is shown clearly in Fig. 5.

The handle or lever 10 which is connected with the cup 8 is adapted when in normal position to rest in a keeper 23 secured on the outer face of the body 1, as shown in Fig. 1, and the outer end thereof is designed to be engaged with one of the notches 7ª, 7ᵇ, 7ᶜ or 7ᵈ, to hold the feed adjuster cap 6 against turning and thereby securely lock it in adjusted position. The hook 11 on the outer end of the lever 10, as already described, is designed to engage the outer face of the cap 6 and limit its outward movement. It will thus be seen that when it is desired for any reason to remove the cap 6 from the body 1 the handle or lever 10 must be raised to remove the hook 11 thereof, and by so raising this lever the cock 8 is closed and thereby cuts off the supply of graphite from the body 1 until the cap has been returned to operative position and the lever moved downwardly into engagement therewith, which movement turns on the supply of graphite.

The base of the reduced end of the cap 6 forms a seat for the inner end of the spring 20, and when said cap 6 is screwed outwardly the tension of the spring is increased and the lever 10 engaging one of the notches in the flange of said cap, holds the feed adjuster spring in the position in which it is set.

In the operation of this device, when the dry graphite is placed in the cup 2 and the handle 10 is moved downward to the position shown in Fig. 1, the cock 8 will be open and the graphite will fall by gravity therethrough and through the passage 3 to the feeder 14 arranged in the body 1. When the handle 10 has been moved downward and the parts are in the position shown in Fig. 4, the nut or cap 6 being screwed into closed position with the reduced end thereof engaged with the head of the feeder, which forces the feeder forward against the tension of the spring 20 in position to close the lower end of the port 3, no graphite may pass into the pockets 15, 16 and 17. The cap 6 is then turned outward into the position shown in Fig. 5 and the spring 20 exerts its pull to move the feeder 14 back into position to expose the pocket 15 to the passage 3 under the cup, in which position said pocket receives a charge of graphite, as shown in Fig. 5. When a vacuum or suction occurs in the pipe 4, atmospheric pressure will force the feeder forward until the lug 21 engages the inner end of the groove 22, in which position the pocket 15 of the feeder will be opposite the air inlet 12 and the graphite outlets 13, as shown in Fig. 6, and the graphite will be drawn by the suction in pipe 4 to the part to be lubricated. When it is desired to supply a greater quantity of graphite to the parts to be lubricated, the cap 6 is screwed farther outward, and the handle 10 is engaged with one of the notches in the periphery thereof to hold it in adjusted position. Two of the pockets 15 and 16 will then be in communication with the passage 3 and will both be supplied with graphite and on the next suction in the pipe 4 the feeder will be moved inwardly to bring both pockets 15 and 16 opposite the air inlet 12 and the graphite discharge outlets 13, and the graphite will be drawn out in the manner above described. When the cap 6 is moved outwardly to its full extent into engagement with the hook 11 on the lever 10, the spring 20 will force the feeder 14 back sufficiently to bring all of the pockets 15, 16 and 17 into communication with the passage 3, and all of them will be filled simultaneously with graphite, and when suction occurs in pipe 4 the feeder will be drawn forward to bring all of said pockets opposite the air inlet 12 and the discharge 13, whereby all of the graphite in the three pockets will be supplied to the parts to be lubricated. These pockets 15, 16 and 17 are preferably made of varying sizes to receive greater or less quantities of graphite, as may be desired.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

I claim as my invention:

1. A lubricator of the class described comprising a body having a bore extending longitudinally therethrough and provided on one side with a graphite supply opening, a valve mounted in said opening and having a lever extending laterally therefrom, a graphite feeder mounted to reciprocate in said bore, adjustable means for controlling the stroke of said feeder in one direction and provided with means for engagement with said lever for locking said stroke controlling means in adjusted position.

2. A lubricator of the class described comprising a body having a bore extending longitudinally therethrough and provided on one side with a graphite supply opening, a valve mounted in said opening and having a lever extending laterally therefrom, a graphite feeder mounted to reciprocate in said bore, adjustable means for controlling the stroke of said feeder in one direction and provided with means for engagement with said lever for locking said stroke controlling means in adjusted position, and coöperating means carried by said feeder and said body for regulating the stroke of the feeder in the opposite direction.

3. A lubricator of the class described comprising a body having a lubricant supply passage and a delivery passage, said body having an air inlet passage arranged opposite said delivery passage, a feeder movable longitudinally in said body and provided with a plurality of independent pockets, adjustable means for regulating the rearward stroke of said feeder to bring one or more of said pockets in position to register with said lubricant supply passage, and means for locking said adjusting means in adjusted position.

4. A lubricator of the class described comprising a body having a bore extending from end to end therethrough and having a lubricant supply passage, a valve mounted in said passage, a lever extending laterally from said valve, a feeder mounted to reciprocate in the bore of said body and having feed pockets arranged therein and provided with a rearwardly extending stem, a coiled spring mounted on said stem, and a member adjustable in said body and provided with means for limiting the stroke of said feeder in one direction and for regulating the tension of said spring, having means for engagement by said lever whereby said member is locked in adjusted position.

5. A lubricator of the class described comprising a hollow body having a lubricant supply passage, a feeder mounted to reciprocate in said body, adjustable means for regulating the stroke of said feeder in one direction, and means for controlling said lubricant supply passage and holding said adjusting means in adjusted position.

6. A lubricator of the class described comprising a body having a lubricant supply passage and a delivery passage with an air inlet arranged opposite said delivery passage, the inner wall of said body having a stop formed thereon, a feeder mounted to reciprocate in said body and provided with lubricant receiving pockets, a stop extending laterally from said feeder and adapted to engage the stop on the wall of said body for limiting the forward stroke of said feeder, and adjustable means for limiting the rearward stroke of said feeder to vary the position of the pockets in said feeder relative to the lubricant supply passage of the body.

7. A lubricator of the class described comprising a body having a lubricant supply passage and a delivery passage with an air inlet arranged opposite said delivery passage, the inner wall of said body having a stop formed thereon, a feeder mounted to reciprocate in said body and provided with lubricant receiving pockets, a stop extending laterally from said feeder and adapted to engage the stop on the wall of said body for limiting the forward stroke of said feeder, adjustable means for limiting the rearward stroke of said feeder to vary the position of the pockets in said feeder relative to the lubricant supply passage of the body, and means for controlling said lubricant supply passage and for locking said adjusting means in adjusted position.

8. A lubricator of the class described comprising a body having a bore extending longitudinally therethrough and provided with a lubricant supply passage and a delivery passage, a feeder mounted to reciprocate in the bore of said body and provided with feed passages, means for limiting the forward stroke of said feeder, a cap adjustably mounted on one end of said body and having means for engaging said feeder to limit its rearward stroke, said cap having a plurality of notches formed in the periphery thereof, a valve mounted in said supply passage, and a lever connected with said valve and adapted to be engaged with one of said notches for locking the valve in open position and for holding said cap in adjusted position.

In testimony whereof I have hereunto set my hand in presence of two subscribing witnesses.

JOSEPH HUVERSTUHL.

Witnesses:
RALPH R. SMITH,
HILDA M. GRAY.

Copies of this patent may be obtained for five cents each, by addressing the "Commissioner of Patents, Washington, D. C."